US009508206B2

(12) United States Patent
Ahearn et al.

(10) Patent No.: US 9,508,206 B2
(45) Date of Patent: Nov. 29, 2016

(54) USAGE OF GPS ON DOOR SECURITY

(71) Applicant: Schlage Lock Company LLC, Indianapolis, IN (US)

(72) Inventors: John Robert Ahearn, Pasadena, CA (US); Joseph Wayne Baumgarte, Carmel, IN (US); Gabriel Daniel Focke, Indianapolis, IN (US); Michael Scott Henney, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 60 days.

(21) Appl. No.: 13/968,669

(22) Filed: Aug. 16, 2013

(65) Prior Publication Data

US 2014/0049369 A1 Feb. 20, 2014

Related U.S. Application Data

(60) Provisional application No. 61/684,110, filed on Aug. 16, 2012.

(51) Int. Cl.
*G08C 19/00* (2006.01)
*G05B 19/00* (2006.01)
*G07C 9/00* (2006.01)

(52) U.S. Cl.
CPC ....... *G07C 9/00174* (2013.01); *G07C 9/00309* (2013.01); *G07C 2009/0042* (2013.01); *G07C 2009/00357* (2013.01); *G07C 2209/04* (2013.01); *G07C 2209/63* (2013.01)

(58) Field of Classification Search
CPC ............ G07C 9/0017; G07C 9/00309; G07C 2009/63; G07C 2009/64; G07C 2009/00309; G07C 2009/00357; G07C 2009/00365; H04L 63/08; H04L 63/0428; H04L 63/0492
USPC ........................................................ 340/5.61
See application file for complete search history.

(56) References Cited

U.S. PATENT DOCUMENTS

| | | | | |
|---|---|---|---|---|
| 6,778,068 | B2 * | 8/2004 | Wolfe | G07C 9/00142 340/5.28 |
| 8,370,911 | B1 * | 2/2013 | Mallard | G06F 21/602 713/185 |

(Continued)

FOREIGN PATENT DOCUMENTS

| | | | | |
|---|---|---|---|---|
| EP | 2364006 | A1 | | 9/2011 |
| JP | 2009127336 | A | * | 6/2009 |

(Continued)

OTHER PUBLICATIONS

International Search Report, Feb. 5, 2014, International Patent Application No. PCT/US2013/055452, ISA/US, 2 pgs.

(Continued)

*Primary Examiner* — Firmin Backer
*Assistant Examiner* — Adnan Aziz
(74) *Attorney, Agent, or Firm* — Taft Stettinius & Hollister LLP

(57) ABSTRACT

A lock system including an electronic lock and a wireless device having a location determining utility configured to determine a location of the wireless device. The electronic lock and the wireless device communicate wirelessly with one another and send commands to and from one another to perform a specific task when the wireless device is within a specified range of the electronic lock. The location of the wireless device and a speed of the wireless device may be used to calculate an estimated arrival of the wireless device at the electronic lock, and the specific task may be performed substantially at the estimated arrival.

13 Claims, 2 Drawing Sheets

(56) References Cited

U.S. PATENT DOCUMENTS

| | | | | |
|---|---|---|---|---|
| 8,570,143 | B2 * | 10/2013 | Nakagawa | G06Q 10/063 340/10.1 |
| 8,662,386 | B2 * | 3/2014 | Radicella | G07C 9/00087 235/380 |
| 8,902,042 | B2 * | 12/2014 | Davis | G07C 9/00571 340/5.1 |
| 9,019,071 | B1 * | 4/2015 | Mallard | G07C 9/00087 340/5.3 |
| 2002/0147006 | A1 | 10/2002 | Coon et al. | |
| 2002/0183008 | A1 | 12/2002 | Menard et al. | |
| 2002/0196123 | A1 * | 12/2002 | Diehl | E05B 47/00 340/5.64 |
| 2003/0179075 | A1 * | 9/2003 | Greenman | E05B 19/0005 340/5.54 |
| 2005/0206498 | A1 | 9/2005 | Tsui et al. | |
| 2005/0284402 | A1 * | 12/2005 | Becker | E06B 7/32 119/484 |
| 2007/0050259 | A1 * | 3/2007 | Wesley | 705/16 |
| 2008/0216156 | A1 * | 9/2008 | Kosaka | G06Q 20/206 726/4 |
| 2008/0278335 | A1 * | 11/2008 | Welte | G07C 9/00111 340/573.3 |
| 2008/0290990 | A1 | 11/2008 | Schaffzin et al. | |
| 2009/0163140 | A1 * | 6/2009 | Packham et al. | 455/41.2 |
| 2009/0167488 | A1 | 7/2009 | Hays et al. | |
| 2010/0075656 | A1 | 3/2010 | Howarter et al. | |
| 2010/0126071 | A1 * | 5/2010 | Hill | E06B 7/32 49/70 |
| 2010/0201536 | A1 * | 8/2010 | Robertson et al. | 340/686.6 |
| 2011/0084831 | A1 * | 4/2011 | Tran | 340/539.1 |
| 2011/0311052 | A1 | 12/2011 | Myers et al. | |
| 2012/0125261 | A1 * | 5/2012 | Van Den Berg | A01K 1/0023 119/14.02 |
| 2012/0280789 | A1 * | 11/2012 | Gerhardt et al. | 340/5.61 |
| 2012/0280790 | A1 * | 11/2012 | Gerhardt et al. | 340/5.61 |
| 2013/0176107 | A1 | 7/2013 | Dumas et al. | |
| 2014/0049361 | A1 | 2/2014 | Ahearn et al. | |

FOREIGN PATENT DOCUMENTS

| | | | |
|---|---|---|---|
| WO | 2007079232 | A2 | 7/2007 |
| WO | 2008056152 | A1 | 5/2008 |

OTHER PUBLICATIONS

International Written Opinion, Feb. 5, 2014, International Patent Application No. PCT/US2013/055452, ISA/US, 7 pgs.

European Search Report; European Patent Office; European Patent Application No. 13829775.9; Apr. 4, 2016; 8 pages.

Mexican Office Action; Mexican Patent Office; Mexican Patent Application No. MX/a/2015/002067; Apr. 15, 2016; 3 pages.

* cited by examiner

USAGE OF GPS ON DOOR SECURITY

CROSS-REFERENCE TO RELATED APPLICATIONS

The present application claims the benefit of U.S. Provisional Patent Application No. 61/684,110 filed on Aug. 16, 2012, the contents of which are incorporated herein by reference in their entirety.

BACKGROUND

The disclosed embodiments generally pertain to locks, and particularly to smart lock systems.

SUMMARY

A lock system is provided with a smart lock that knows its specific location, and a wireless device with capabilities of utilizing location determining utilities, such as the Global Positioning System. The smart lock and the wireless device may be able to communicate between one another and send commands to and from one another to perform specific tasks when the wireless device is in a specified range of the smart lock.

BRIEF DESCRIPTION OF THE ILLUSTRATIONS

Embodiments of the invention are illustrated in the following illustrations.

DETAILED DESCRIPTION

Figure 1:
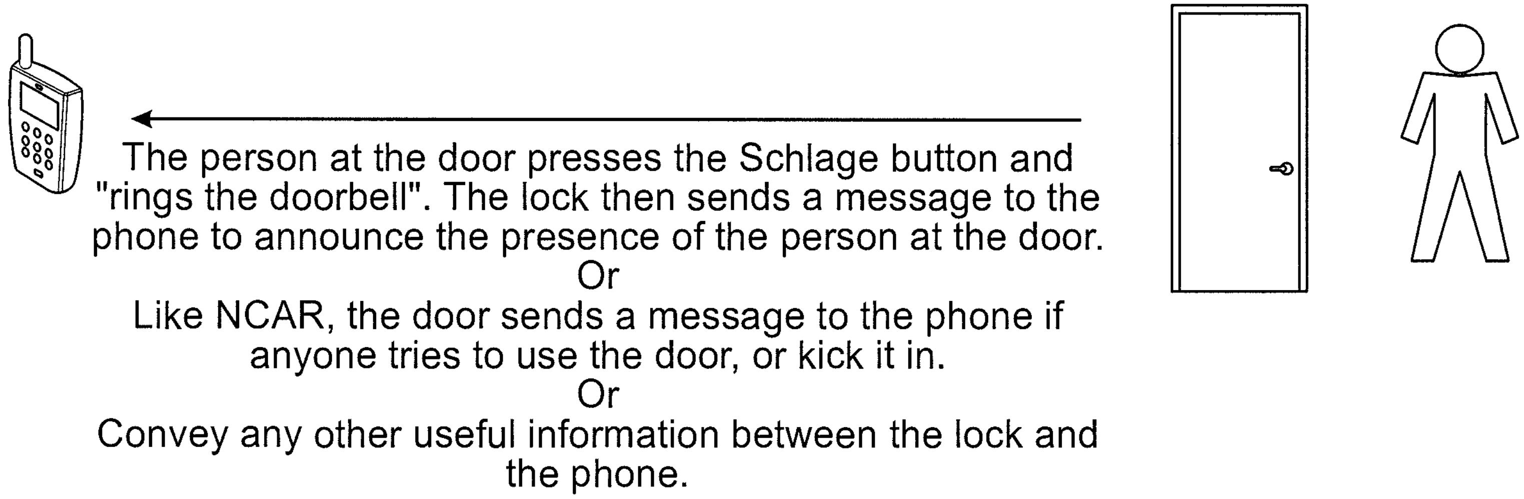
FIG. 1 is a schematic of a wireless device communicating with a lock so that the lock can make decisions.
Figure 2:
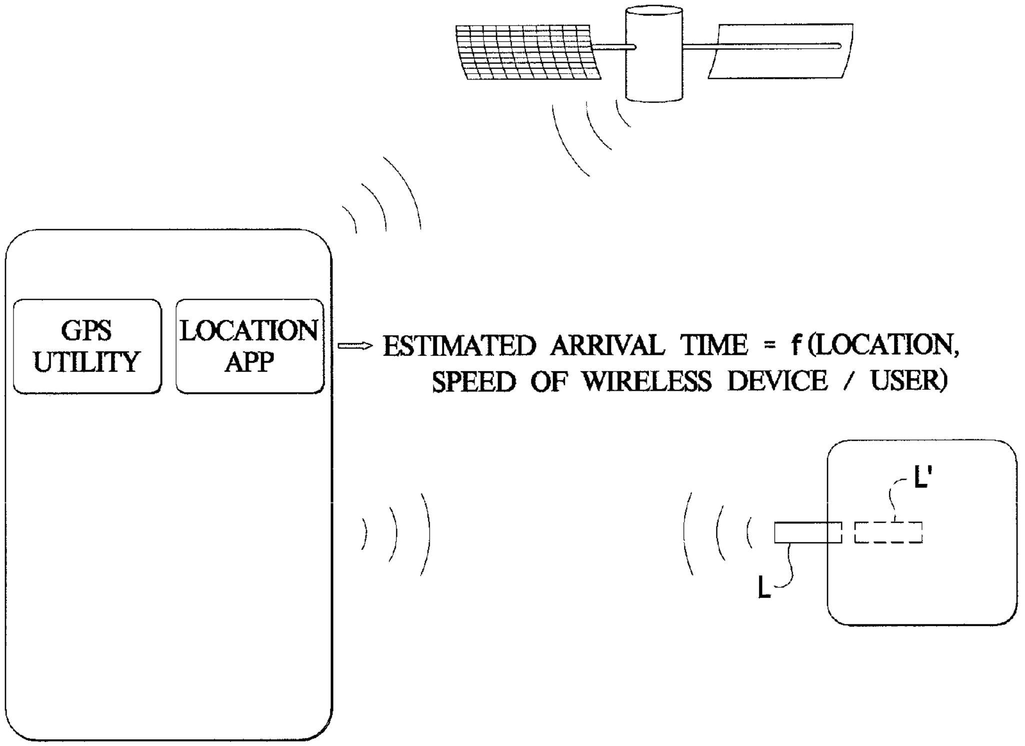
FIG. 2 is a schematic of an electronic lock and wireless device communication system.
Figure 3A:
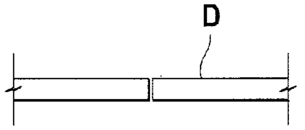
FIGS. 3A and 3B show a closed door and an open door, respectively.
Figure 3B:
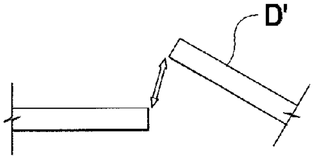

Referring to FIG. 1, a schematic of a wireless device, such as a smart phone, communicating with a lock so that the lock can make decisions is provided. As shown in FIG. 2, an application (or app) may be installed on the wireless device and may utilize a location determining utility, such as the Global Positioning System ("GPS"), to know the location of any given smart lock as well as the location of itself. In one non-limiting embodiment, the location and speed of the user, through the location and speed of the wireless device on their person, can be used to calculate when the user will arrive at the associated lock. In some forms, the calculation is determined once the wireless device is in a given range of an associated lock. These features can then enable the lock to auto-unlock as the user arrives as shown in FIG. 2 with locked lock L and unlocked lock L'. Other functions may also be incorporated into the system, such as but not limited to automatically opening the door as shown by closed door D in FIG. 3A and open door D' in FIG. 3B, automatically closing the door behind the user as shown by open door D' in FIG. 3B and closed door D in FIG. 3A, locking the door behind the user as shown by lock L in FIG. 2, combinations thereof, and the like.

Use of location determining utilities, such as GPS, can actually be used for the phone application to determine if the app needs to actively search for locks to unlock. The app can know which sites' locks it is allowed to unlock, and if it is nowhere near those sites, then it can auto-disable to save battery life. For example, if a wireless device is out of range of any associated locks, then the installed app may stop looking for these associated locks and shut down to conserve battery life on the wireless device.

Use of location determining utilities can also allow certain commands to automatically be sent to the lock. For example, if someone walks through their lock, the phone could be configured to auto-lock the door (e.g. auto-privacy, auto-apartment, or other auto-"function") simply based upon who passes through a door and any custom configuration programmed into the app. In other additional and/or alternative examples, the lock may also be programmed to do different things when different wireless devices come through the door. For example, a lock may be programmed to auto-lock when a child's wireless device enters the home, but not when an adult's wireless device enters the home.

Given the ability of a smart phone and/or credential to communicate relative position and speed, an estimate of when a user would need to interact with a lock can be calculated. This can enable the ability of not just auto-unlock, but also auto-open or any other automatic desired features.

Use of the GPS can be used for a wireless device, such as a smart phone, to determine if the app needs to actively search for locks to unlock. The app can know which sites' locks it is allowed to unlock, and if it is nowhere near those sites, then it can auto-disable and save battery life.

The GPS could be used during installation to automatically locate the lock and program it into the system. For example, after installation of the lock, the installer could set the lock up to have knowledge of its own location, either using the GPS or by programming.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock system, comprising:

an electronic lock;

a wireless device having a location determining utility configured to determine a location and a speed of the wireless device and a user associated with the wireless device relative to the electronic lock; and wherein the electronic lock and the wireless device communicate wirelessly with one another and send commands to and from one another for the electronic lock to perform a specific task when the wireless device and user are within a specified range of the electronic lock, and calculate an estimated arrival time of the wireless device and the associated user at the electronic lock, wherein the specific task includes:

automatically unlocking the electronic lock as the wireless device approaches the electronic lock;

and in response to a first identity of a first user associated with the wireless device, automatically locking the electronic lock behind the wireless device after the wireless device passes through a door associated with the electronic lock and, in response to a second identity of a second user associated with the wireless device, leaving the electronic lock unlocked after the wireless device passes through the door associated with the electronic lock.

2. The lock system of claim 1, wherein the location determining utility comprises a GPS utility.

3. The lock system of claim 1, wherein the specific task includes automatically unlocking the electronic lock at the estimated arrival time, and wherein the specific task further comprises automatically opening or closing a door associated with the electronic lock at the estimated arrival time.

4. The lock system of claim 1, wherein the location determining utility comprises an application that is configured to actively search for one or more of the electronic lock and to know specific ones of the electronic lock the wireless device is permitted to unlock.

5. The lock system of claim 4, wherein the application auto-disables to save battery life if each of the specific ones of the electronic lock are out of range.

6. A lock system, comprising:

an electronic lock; and a wireless device in wireless communication with the electronic lock and having a location determining utility configured to determine a location of the wireless device and a user associated with the wireless device;

wherein the location of the wireless device relative to the electronic lock and a speed of the wireless device and the associated user are used to calculate an estimated arrival of the wireless device and the associated user at the electronic lock; and wherein a specific task is performed by the electronic lock substantially at the estimated arrival of the wireless device and the associated user at the electronic lock, wherein the specific task includes:

automatically unlocking the electronic lock as the wireless device approaches the electronic lock: and in response to a first identity of a first user associated with the wireless device, automatically locking the electronic lock behind the wireless device after the wireless device passes through a door associated with the electronic lock and, in response to a second identity of a second user associated with the wireless device, leaving the electronic lock unlocked after the wireless device passes through the door associated with the electronic lock.

7. The lock system of claim 6, wherein the location determining utility comprises a GPS utility.

8. The lock system of claim 6, wherein the specific task further comprises automatically opening or closing a door associated with the electronic lock at the estimated arrival time.

9. The lock system of claim 6, wherein the location determining utility comprises an application that is configured to actively search for one or more of the electronic lock and to know specific ones of the electronic lock the wireless device is permitted to unlock.

10. A method, comprising:

determining a first location associated with a wireless device and a user of the wireless device;

comparing the first location to a second location associated with an electronic lock;

searching for the electronic lock with the wireless device in response to a first result of the comparing;

determining a speed of the wireless device and the associated user relative to the electronic lock;

calculating an estimated arrival time at which the wireless device and the associated user will arrive at the electronic lock;

automatically unlocking the electronic lock substantially at the estimated arrival time as the wireless device approaches the electronic lock;

in response to a first identity of a first user of the wireless device, automatically locking the electronic lock behind the wireless device after the wireless device passes through a door associated with the electronic lock and, in response to a second identity of a second user of the wireless device, leaving the electronic lock unlocked after the wireless device passes through the door associated with the electronic lock; and terminating the searching in response to a second result of the comparing.

11. The method of claim 10, wherein the first result indicates the wireless device is in a given range of the electronic lock, and the calculating is performed in response to the first result.

12. The method of claim 10, wherein the first result indicates the wireless device is in a given range of the lock, and the second result indicates the wireless device is out of range of the lock.

13. The method of claim 10, further comprising sending a command to the electronic lock via the wireless device in response to the first result.

* * * * *